United States Patent [19]

Shepard et al.

[11] Patent Number: 5,195,851
[45] Date of Patent: Mar. 23, 1993

[54] APPARATUS AND METHOD FOR TRANSFERRING DRY BULK MATERIALS HAVING AN IMPROVED UNLOADING ADAPTER

[75] Inventors: James M. Shepard, Hockessin, Del.; Michael J. Schunk, Boonton, N.J.

[73] Assignee: General Chemical Corporation, Parsippany, N.J.

[21] Appl. No.: 791,564

[22] Filed: Nov. 12, 1991

[51] Int. Cl.⁵ .................. B65G 53/40; B65G 53/36
[52] U.S. Cl. ........................... 406/121; 406/124
[58] Field of Search ............ 406/121, 145, 151, 124, 406/125, 126, 108, 122, 113

[56]  References Cited
U.S. PATENT DOCUMENTS

| 1,843,460 | 2/1932 | Rosenberger | 406/122 |
| 3,236,565 | 2/1966 | Kester et al. | 406/121 X |
| 3,379,477 | 4/1968 | Beckmeyer | 406/121 |
| 4,884,925 | 12/1989 | Kemp et al. | 406/109 |

FOREIGN PATENT DOCUMENTS 267614  11/1988  Japan ................... 406/121

OTHER PUBLICATIONS

General Chemical Soda Ash Technical/Handling, 1988.

Primary Examiner—Russell D. Stormer
Assistant Examiner—James M. Kannofsky
Attorney, Agent, or Firm—Mathews, Woodbridge & Collins

[57] ABSTRACT

The present invention relates to an adapter which is useful to receive dry bulk chemicals with a minimum of dust escaping to the environment and which screens the free flowing dry bulk chemicals.

25 Claims, 4 Drawing Sheets

APPARATUS AND METHOD FOR TRANSFERRING DRY BULK MATERIALS HAVING AN IMPROVED UNLOADING ADAPTER

BACKGROUND OF THE INVENTION

1. Field of the Invention

This application relates to an adapter for transferring dry chemicals to and from a storage container, such as a railroad car, truck, ship or storage tank and related system and method. The invention is particularly suitable for use with particulate chemicals which form hydrates which can contain difficult to handle particles or which include particles which tend to agglomerate, such as soda ash.

2. Description of Related Art

Various means have been described for transferring dry materials out of containers. For example, U.S. Pat. No. 3,512,842 describes a method for unloading railcars in which a slurry is formed inside the railcar and then is pumped out. Such a process has numerous drawbacks, however, including the risk of overflowing or foaming within the car; the need for specialized railcars adapted for use in the slurrying process; the possibility of corrosive solutions being formed and damaging the railcar; problems with residual moisture causing caking in subsequent shipments; and the formation of hard, slowly dissolving lumps when liquid is added to a large quantity of solid. A similar approach is described in U.S. Pat. No. 4,189,262.

Eductors have been used and are still used to transfer dry chemicals as a slurry, solution or solid. For example, liquid driven eductors have been used to slurry dry polymers and activated carbon in the water treatment industry and to transfer fly ash in the electric power industry. Also air, steam, and liquid driven eductors have been used for transfer of solids. However, problems are known to exist with eductor-based handling systems.

For example, air driven eductors require a high power input and air flow per unit mass of solid conveyed resulting in high energy costs and higher capital cost for dust collection equipment. Steam driven eductors are used to create a vacuum for pneumatic conveying of dry solids to a solid-liquid mixing apparatus. The systems using steam driven eductors which are known to the inventors require a large amount of support equipment including a barometric leg for condensing the steam with modifications for solid-liquid mixing, and a large steam supply. Since the solid is conveyed by vacuum, the steam driven eductor system is limited by economics to installations where it can be located near, e.g. within a few hundred feet of, the container of dry chemical.

Liquid driven eductors do not require large volumes of air or steam and can be used to transfer dry chemicals from a container, such as a railcar, forming a solution or slurry of the chemical in the liquid carrier medium. Liquid driven eductors are known to be successfully used to prepare dilute solutions of polymer in water as well as to transfer insoluble materials, e.g. activated carbon, to storage as a slurry.

Commonly assigned U.S. Pat. No. 4,884,925, discloses an apparatus and method for transfer and slurrying or dissolving hydratable dry bulk chemicals hereby incorporated by reference. Briefly, this patent discloses an apparatus for the transfer of dry chemicals. The disclosed apparatus has a sealed solvation hopper positioned between a liquid driven eductor and a fitting for connection to a storage container such as a railroad car. At the inlet end of the solvation hopper is a chemical inlet pipe which connects the interior to the exterior of the hopper. Surrounding the chemical inlet pipe are a plurality of nozzles for introduction of solvation liquid into the hopper. The nozzles are disposed such that the solvation liquid washes the interior surface of the hopper to prevent plugging by hydrates (solvates) which may be formed. At the outlet end of the hopper is connected to a suction opening of the liquid driven eductor.

In operation, liquid flowing through the eductor creates a suction and draws dry chemical out of the storage container and into the hopper. In the hopper, solvation liquid is supplied through the nozzles to wet the dry chemicals and to wash the surfaces of the hopper, pushing the wetted material toward the outlet end of the hopper. At the outlet end of the hopper, the wetted material is sucked out of the eductor where it is combined with the flow of eductor liquid. The material leaving the eductor is recovered and sent to storage or directly for processing. The process and apparatus are particularly useful for handling soda ash.

Dry bulk solids, particularly soda ash, shipped in a particulate state are removed from the shipping containers as recited above and converted directly into a hydrate. By hydrated it is meant that the dry chemical is combined with water to form a mixture of water and particulate matter. The mixture can include a slurry and/or solution. Because such large quantities of dry particulate matter are handled there is a continuing problem of dealing with large particular impurities, insolubles, and soda ash which is lumped together by exposure to moisture. In particular, lumps of soda ash which form, are in the form of sodium carbonate decahydrate and are difficult to dissolve causing plugging in the hydrator, particularly in the mixing cone of the hydrator of the type disclosed in U.S. Pat. No. 4,884,925.

SUMMARY OF THE INVENTION

The present invention relates to an adapter which is useful to receive dry bulk chemicals with a minimum of dust escaping to the environment and which screens the free flowing dry bulk chemicals.

The apparatus of the present invention is an unloading adapter for bulk dry particulate matter. The adapter comprises an enclosed adapter inlet and an adapter outlet. There is a screen located within the adapter chamber preferably separating the adapter chamber into a pre-screen chamber and a post-screen chamber. The screen can be in the shape of a pyramid or a cone having a screen apex and a screen perimeter. The apex of the screen faces the adapter inlet and the perimeter fits or butts against the perimeter of the adapter chamber. Particulate matter enters into the adapter inlet and into the pre-screen chamber. It falls through the screen into the post-screen chamber and is withdrawn from the post-screen chamber through the adapter outlet. The preferred screen is in the shape of a cone. The perimeter of the screen can abut against the internal, lateral perimeter of the adapter chamber.

The adapter housing preferably comprises a base, and at least one lateral wall attached to the base. The lateral wall forms an enclosed perimeter. There is a top attached to the lateral wall opposite the base. The adapter inlet passes through the top. Preferably, the lateral wall is cylindrical and with the top and the base form an adapter chamber. The adaptor screen is conical and attached to the lateral wall and the apex faces the adapter inlet.

The apparatus further comprises means to prevent dust from entering the environment from the adapter inlet. The inlet is designed to receive a conduit in communication with a source of particulate matter. The end of the conduit preferably passes through the adapter inlet. There is a means positioned between the conduit and the inlet to prevent the escape of dust from the adapter chamber into the surrounding environment. Preferred means includes a boot, dust shroud or dust cover.

The adapter outlet preferably is in communication with, and more preferably connected to an outlet conduit.

The apparatus of the present invention is used in a system to transfer particulate matter solids from a storage source, screen the particular solids and hydrate the solids. In accordance with the system, there is a storage container, such as a railroad car, truck or storage tank or the like for particulate solids. The storage container comprises a storage outlet. There is a conduit from the storage outlet which communicates with an unloading adapter as recited above.

The adapter of the present invention is particularly designed to be used with a hydrator which creates a vacuum. The preferred hydrator comprises a means to draw solid particulate material from the adapter outlet. The hydrator includes a means to transfer the hydrated particulate material from the hydrator.

A preferred hydrator comprises a solvation hopper comprising a hopper wall, a hopper inlet and a hopper outlet. There is a hopper inlet conduit sealingly communicating with the hopper through the hopper inlet. The hopper inlet conduit is in communication with the adapter through the adapter outlet. Preferably it communicates with an adapter conduit which is sealingly connected to the post-screen chamber at the adapter outlet.

The hydrator comprises a liquid driven eductor comprising an eductor liquid inlet, an eductor liquid outlet and an eductor suction opening. The eductor suction opening is in sealed communication with the hopper outlet and through the hopper outlet to the adapter outlet. In this way, solid particulate matter is drawn from the adapter chamber into the hydrator.

There can be a suitable means, such as a pump, to transfer the hydrated particulate matter from the eductor outlet to a slurry storage tank.

In a particularly preferred system the source of particulate matter is a truck having a truck outlet at the bottom to gravity unload therethrough to the adapter chamber. There is a suitable truck outlet conduit which communicates from the storage compartment of the truck to the adapter chamber passing through the adapter inlet. A dust shroud is positioned between the truck outlet conduit and the adapter inlet to prevent dust from blowing out into the environment.

The system of the present invention is useful in a method to transfer solid particulate matter, preferably a flowable powder such as soda ash from a rail car or truck. The adapter as recited, is connected to a source of particulate solids. Particulate solids are transferred from the source to the adapter chamber. Such transference can be by gravity flow or by being blown from the source to the adapter chamber. The adapter chamber comprises a pre-screen chamber into which the particulate matter enters. The particulate matter passes through the screen in the adapter chamber with large particles falling to the perimeter of the cone and the middle of the screen remaining clear to particles which can pass through the screen to permit passage therethrough. The adapter outlet is opened to communicate with the hydrator. Particulate solids are drawn from the outlet of the adapter to the hydrator.

The hydrator can be any suitable means for hydrating the liquid and drawing the particulate means from the adapter. Preferably the hydrator comprises an eductor. A liquid stream is passed through the eductor and a reduced pressure is formed at a suction opening of the eductor. The suction opening is in communication with the outlet of the adapter. Particulate solids are drawn through a feed conduit communicating from the adapter outlet into the liquid eductor through the suction opening of the eductor. In a particularly preferred hydrator, there is a hopper in which the particulate solids are fed and mixed with a liquid. The hydrated particulate solids are drawn from the hopper into the suction opening of the eductor.

In accordance with the present invention the adapter provides for a system and method of transferring bulk particulate chemicals with a minimum of dust entering the atmosphere. Larger particles are screened and hydrated, and finally passed on for storage or further processing as hydrated particulate matter in the form of a solution or slurry.

DESCRIPTION OF THE PREFERRED EMBODIMENTS

The present invention will be understood by those skilled in the art by reference to the accompanying figures.

Figure 1:
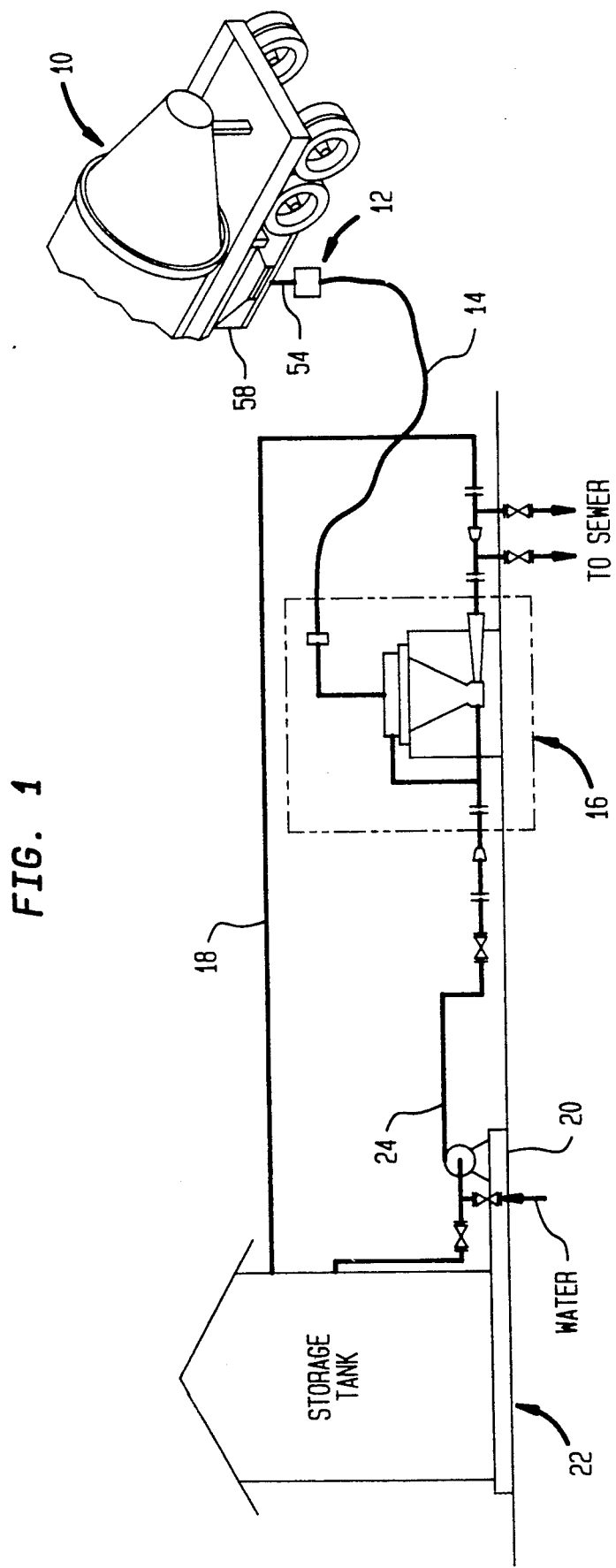
FIG. 1 is a schematic drawing of a system for use with the method and apparatus of the present invention.

FIG. 1 illustrates a system including the apparatus of the present invention. During typical operation, a source of dry particulate chemical is brought to the system from a suitable container. Typically, the container can be a dry particulate storage container, but more commonly it is a transportation container such as a railroad car or truck 10. In accordance with the system of the present invention, the contents can be unloaded into an adapter 12 in communication with truck 10. The particulate material is preferably a free flowing material such as soda ash.

The particulate material is continually removed from truck 10 through a suitable conduit such as a flexible hose 14. The driving force to remove the free flowing particulate powder from the truck can be gravity or air pressure. The particulate material can be transferred using a suction force created by a fluid eductor which can also be used as part of an apparatus which hydrates the powdered or particulate material.

The particulate material flows through a flexible hose 14, through adaptor 12 to hydrator 16. The hydrator converts the particulate material to a slurry or solution which will be referred to as hydrated particulate solids. The hydrated particulate solids are then transferred through a hydrated solid transfer line 18, using a suitable transfer means such as a pump 20 to a hydrated solid storage tank 22. During storage, some of the liquid may rise to the top of the stored solids. This liquid can be recycled back through recycle line 24 to the hydrator 16 for use in the eductor therein, or simply sent to a waste area.

The preferred adapter 12, used as an unloading adapter in the system shown in FIG. 1, can screen and form a reservoir of particulate matter against which a suction generating hydrator can draw the particulate matter. The adapter is enclosed and comprises an enclosed adapter housing 26. The housing comprises an adapter chamber 28, an adapter inlet 30 and an adapter outlet 32.

An adapter screen 34 separates the adapter chamber 28 into a pre-screen chamber 36 and a post-screen chamber 38. The adapter screen 34 is in the shape of a pyramid or cone having a screen apex 40 and a screen perimeter 42. The screen apex 40 faces the adapter inlet 30. The screen perimeter sits against the inside perimeter of the adapter chamber thereby separating the chamber into pre-screen chamber 36 and post-screen chamber 38.

A preferred adapter comprises an adapter base 44 with at least one lateral wall 46, attached to the base 44. The lateral wall 46 forms an enclosed perimeter. The shape of the perimeter is preferably circular so that the lateral wall is a cylinder and has an adaptor axis 47. The adapter further comprises a top 48 attached to the lateral wall opposite base 44 with the adapter inlet 30 passing through top 48. The adapter outlet 32 passes through base 44, and preferably through lateral wall 46 at or near base 44 in communication with the post-screen chamber 38. In the preferred configuration the lateral wall 46 is cylindrical with the lateral wall 46, base 44 and top 48 forming an adapter chamber 28. The inlet 30 is preferably coaxial with wall 46. The adapter screen 34 is in the shape of a cone with a circular perimeter which abuts the circular lateral wall 46 of the chamber 28, and the apex is coaxial with and faces inlet 30.

Figure 2:
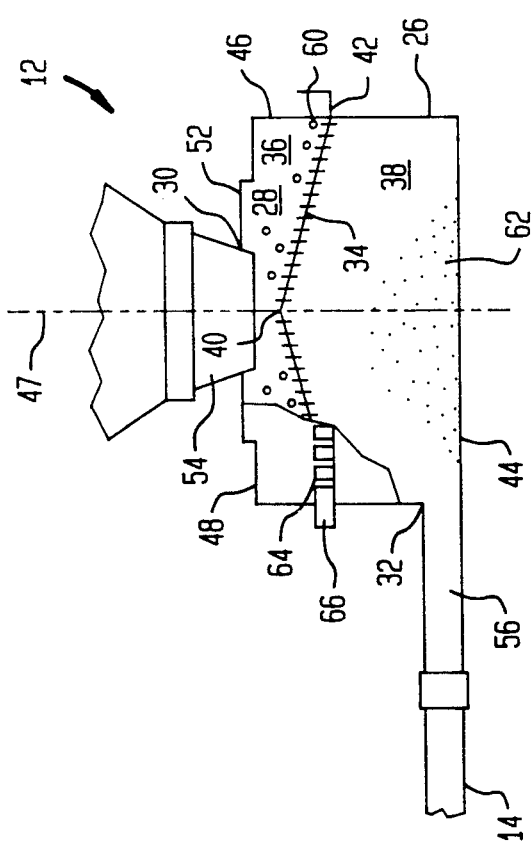
FIG. 2 is a partial sectional schematic view of a preferred embodiment of the adapter of the present invention.

The adapter 12 of the present invention preferably is at least partially confined to minimize dust from exiting the inlet 30 into the environment. A useful means to minimize communication between chamber 28 and the environment can be used. Such a means can be any suitable shroud, or a sliding closure. Referring to FIG. 2, there is a shroud 52 around the inlet 30 through which an inlet feed conduit 54 can pass with there being a minimum of space between the shroud 52 and the outer wall of conduit 54. The shroud can be flexible elastomeric, textile or a composite material. The adapter 12 can optionally and preferably have an outlet conduit 56 in communication with outlet 32. Preferably, outlet conduit 56 is sealingly connected to outlet 32.

Optionally, the apparatus of the present invention preferably contains a suitable means to remove large particles or conglomerates that do not pass through screen 34. In operation, the dry particulate matter falls from conduit 54 onto screen 34. Finer particles 62 pass through the screen. Because of the conical shape of the screen, larger particles 60 fall toward the perimeter 42 of the screen. The large particles accumulate between the inside of lateral wall 46 and screen 34 at the perimeter. Any suitable means can be used to remove particles which accumulate at this location within pre-screen chamber 36. A useful and preferred means to collect and remove large particles 60 is illustrated in FIG. 2. In this embodiment the lateral wall 46 above the screen perimeter, adjacent to the pre-screen chamber 36, contains at least one and preferably a plurality of openings 64. Preferably there are a plurality of openings spaced through the lateral wall 46 above the perimeter 42. The large particles fall down the conical surface of screen 34 through the openings onto an opening landing 66 from which they can be continually collected and removed; or reduced in size by a suitable means including manually breaking them to a smaller size.

The adapter 12 is preferably of sufficient dimensions to be easily used beneath a truck of the type illustrated in FIG. 1. The truck outlet openings are usually from 6 to 18 inches in diameter. Accordingly, the adapter inlet 30 should be of sufficient diameter to receive the truck outlet, i.e, conduit 54, which is at least 6 inches in diameter. Shroud 52 at inlet 30 minimizes the escape of dust between the shroud and the conduit 54. The adapter can be circular, rectangular or square. A circular adapter 12 has an outer diameter of from about 2 feet to about 6 feet and typically, about 2.5 feet to about 4 feet. A useful adapter is from 1 to 3 feet in height. The holes 64, through which the larger particles can pass, should be of sufficient size to permit particles to pass which are between at least about 2 inches up to about 8 inches in diameter, and more typically, 2 to 6 inches in diameter.

The apparatus of the present invention is useful in a system to transfer, typically by gravity flow, dry bulk blowable powder, such as soda ash, from a storage container or transport means, such as a railroad car or truck 10, through a hydrator to a hydrated storage tank 22. In accordance with the system, a storage container, such as a truck 10, contains particular solids and has a storage container outlet 58. The storage container outlet communicates with an unloading adapter, optionally through a suitable line, such as feed conduit 54 as discussed above.

The particulate matter is fed from the storage container 10 through outlet 58 and feed conduit 54 into adapter 12. In adapter 12 the particulate matter is screened and large particles 60 are separated from fine particles 62 which pass through screen 34. The fine particles 62 can then be drawn from the adapter by suction formed in hydrator 16. The dry particulate material is mixed with liquid in the hydrator and transferred from the hydrator to a suitable storage means 22 for further processing.

The preferred hydrator comprises a liquid driven eductor 126. The eductor comprises an eductor liquid inlet 128, an eductor liquid outlet 130, and an eductor suction opening 132. The eductor has a venturi 127 which results in a pressure reduction at opening 132 when liquid flows from inlet 128 to outlet 130.

Figure 3:
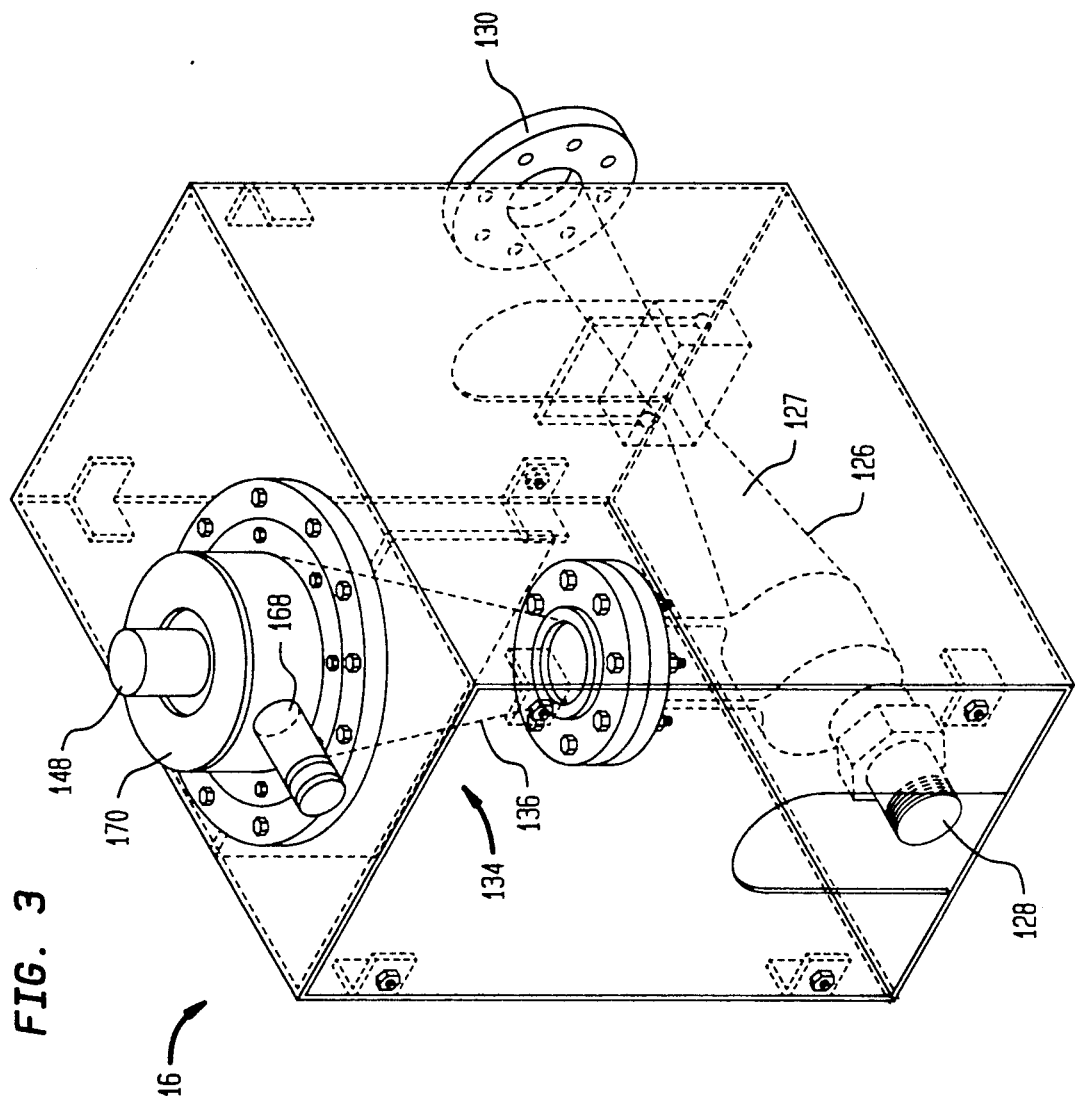
FIG. 3 is a view in perspective of a preferred hydrator of the present invention.

There is preferably a solvation hopper 134 which comprises a hopper wall 136, a hopper inlet 138, and a hopper outlet 140. The hopper outlet 140 is connected to the eductor suction opening 132. Preferably it is sealingly connected, such as by a hopper outlet flange connected through a sealing gasket to a suction opening flange as illustrated in FIG. 3.

The hopper wall 136 preferably defines a hopper chamber 144 in a continuous lateral enclosure. The hopper wall extends from the hopper inlet 138 to the hopper outlet 140.

Figure 4:
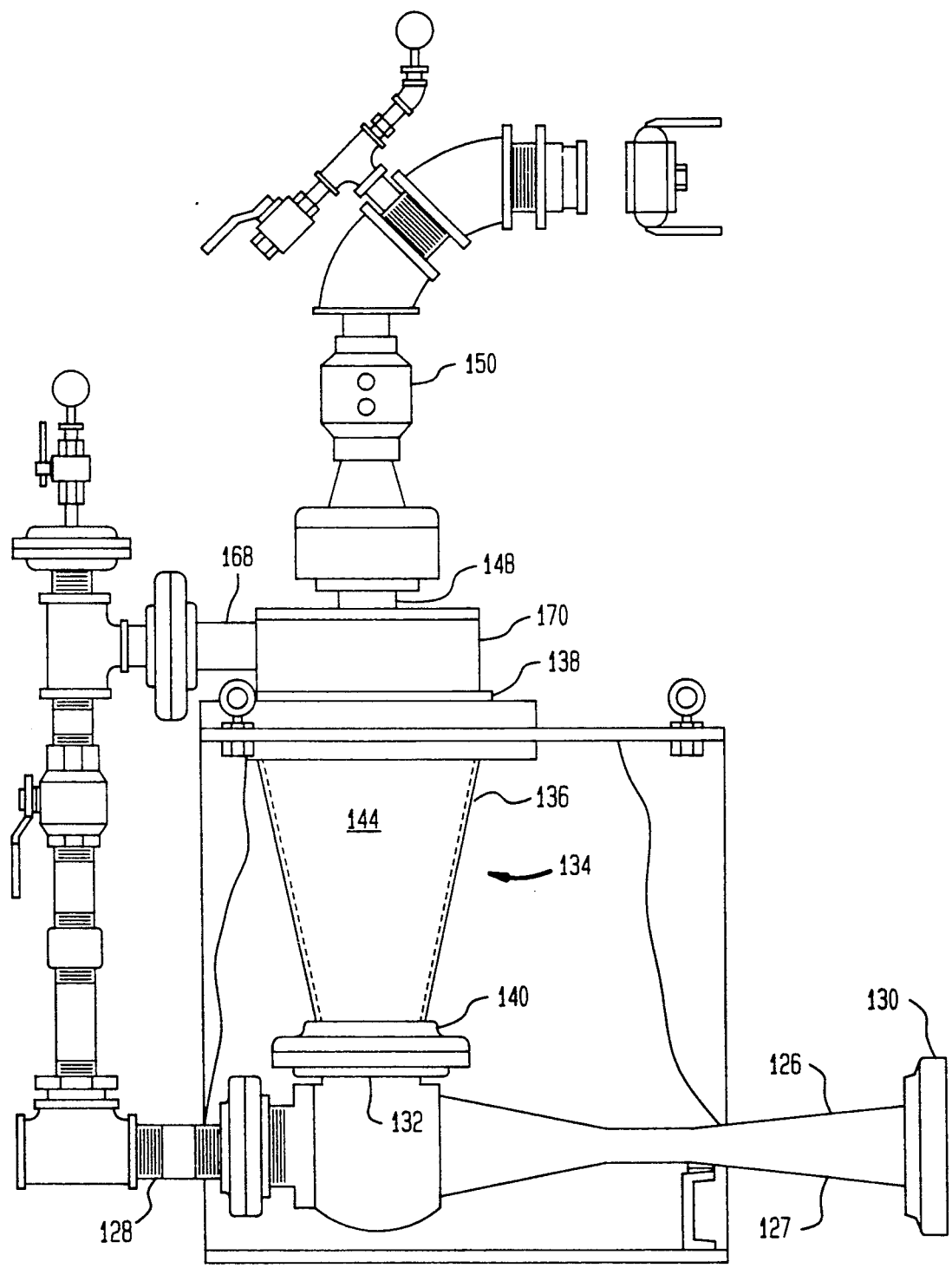
FIG. 4 is a side view of the hydrator shown in FIG. 3.

There is suitable communication means between the hopper inlet 138 and the dry particulate solid container 10. Such means comprise a feed or hopper inlet conduit 148. Preferably the hopper inlet conduit is sealingly connected to the hopper inlet 138. The hopper inlet conduit communicates between the hopper chamber 144 and the solid particulate feed source, such as container or truck 10. As illustrated in FIG. 4, such communication can include a plurality of separate pieces including a swivel 150 and other flexible conduit elements to enable the, hopper inlet conduit 148 to be interconnected to the container or truck 10.

Figure 5:
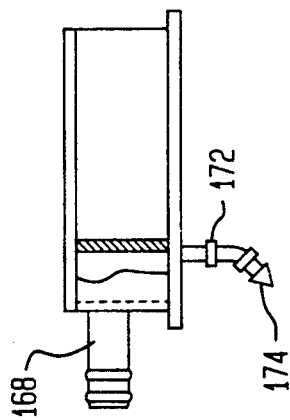
FIG. 5 is a partial sectional view of the top of a hopper showing one nozzle disposed to pass fluid into the hopper.

In certain processes, such as those in which a slurry of soda ash is formed, it is desirable to hydrate the particulate solids as they are transferred into the hopper chamber 144. In order to do this, there are suitable means to feed a solvating liquid, which is preferably the same liquid used to drive the eductor into the hopper. Preferably, the solvating liquid is fed into the hopper through at least one, and preferably, a plurality of nozzles. Referring to FIGS. 4 and 5, there is a solvating liquid inlet conduit 168. The liquid is fed to the hopper chamber through solvating liquid inlet conduit 168. The inlet conduit communicates through manifold 170 to at least one nozzle conduit 172 and finally to nozzle 174. Preferably, the nozzles are disposed to spray the solvation liquid in a direction tangent to the hopper chamber interior wall at an angle to the axis of the hopper. In this way, the nozzles cause a spray of fluid to be directed in a swirling motion around the hopper wall as the fluid and particles mix and move down toward the eductor suction opening 132 of eductor 126. The solvating mixture of solvation liquid and solid particles formed in hopper chamber 144 is sent through educator suction 132 in eductor 126 and is transferred to a suitable storage tank 22 or to direct chemical processing. It is preferred that the hydrating liquid in the hopper chamber 144 as well as the liquid used to drive eductor 126 be the same liquid. In this way, the same liquid can be used for a dual purpose and recycled. The hydrator 16 as described above is preferably used in the system as shown in FIG. 1.

In particular, particulate solids are fed from a container such as truck 10 into adapter 12 and drawn from the adaptor into the hydrator as disclosed above.

In operation, the source of particulate solids, such as a truck 10, is connected in communication with the adapter 12 as recited above. The particulate material is fed from the truck and preferably through feed conduit 54 to the chamber 28 of the adapter. In the adapter there is an adapter screen 34. The free flowing particulate material of the desired size will freely fall through the screen 34. The screen can be any suitable size depending on the material to be screened to exclude the passage of undesirable large particles, agglomerates or clumps of material. Useful screens having openings abut 0.25 to 2.0 inches square or in diameter. Particles in excess of about 3 inches in diameter should be excluded by the screen and removed at openings 64.

Larger particles are trapped on the screen. Because of the conical shape of the screen, they will fall toward the screen perimeter 42 and are separated from the bulk flow of the desired fine particles 62 particulate matter which passed through screen 34 and exits the adapter outlet through outlet conduit 56. The larger particles can be reduced in size or removed through suitable openings, i.e., openings 64.

The fine particles 62 in the post-screen chamber 38 are drawn to hydrator 16 by reduced pressure caused at eductor 126. The reduction in pressure in suction opening 132 of the eductor 126 is caused by passing liquid stream through the eductor liquid outlet 130. This reduced pressure draws particulate solid through flexible feed conduit 14 communicating with the adapter outlet 32 and the eductor through the suction opening 132. Preferably, the particulate solid is fed through a feed conduit 14 to hopper 134 in which it is hydrated and the hydrated particulate solid passes from the hopper into the eductor.

The hydrator comprises an eductor which causes a reduction of pressure at the suction opening of the eductor 126. Preferably the suction opening of the eductor is connected in communication with a hopper 134 having the hopper chamber 144 which in turn communicates with the adaptor. There is preferably a solvating liquid which is fed into the hopper chamber to form a hydrated mixture with the particulate solid. This hydrated mixture is drawn into the suction opening and exits from the eductor outlet 130.

The apparatus and method of the present invention are particularly useful in handling soda ash in the system as disclosed in U.S. Pat. No. 4,884,925. The conduits leading to and from the adaptor are preferably three to four inches in diameter. However any suitable conduit can be used. A preferred eductor is a four-inch eductor having three-inch diameter inlets and outlets. A preferred hopper is a conical shape hopper having a narrow diameter which fits into a four-inch suction opening at the hopper outlet and opens to an approximately ten-inch hopper inlet diameter at the hopper inlet 138. The hoses used to bring the dry particulate powder to the hydrator are preferably three-inch flexible hoses. The slurry conduits are preferably three-inch diameter conduits.

The apparatus and method of the present invention is particularly useful with free flowing fine grained solids having a solid transport rate of about 0.170 tons per minute. Solid transport rate is defined in U.S. Pat. No. 4,884,925. The quantity of solvation liquid required to ensure smooth operation depends on the size of the solvation hopper, e.g., the larger the solvation hopper the more surface area is available for accumulation of hydrates, the orientation of nozzles, and on the dry chemical being handled. For non-hydratable hydratable dry chemicals such as activated carbon and sodium bicarbonates, smooth operation may be obtained without solvation liquid being supplied from the nozzles, although it is preferred that a small quantity be provided to keep all the interior wall of hopper chamber 144 clean for hydratable dry chemicals, such as soda ash, handled with the apparatus of this invention. The solvation liquid flow rate gallons per pound can be determined as disclosed in U.S. Patent No. 4,884,925.

The flow rate for solvation liquid fed to nozzles will be in the range of 0.05 to four times the quantity of the solvation liquid flow rate. The solid transport rate and the solvation liquid flow rate factors together determine the flow rate of said liquid. In this regard, low pressure nozzles such as 60 psi or less, are useful on the high side of the range and high pressure nozzles of 140 psi or more will be useful on the low side of the range.

The volume of the hopper chamber should be sufficient so that there is a normal residence time of the solvation liquid in the hopper, generally from 0.5–30 seconds.

The solvation liquid and eductor liquid are preferably selected for compatibility with the transport chemical and the intended use of the chemical. In many cases, just a solvent, for example, water, can be used as both liquids. If a slurry of soluble chemical is desired, on the other hand, it may be advantageous to employ a saturated solution of chemical as the solvation liquid, the eductor liquid or both.

While exemplary embodiments of the invention have been described, the true scope of the invention is to be determined from the following claims.

What is claimed is:

1. An unloading adapter for bulk dry particulate solid matter comprising:
    an environmentally enclosed adapter housing comprising an adapter chamber, an adapter inlet and an adapter outlet;
    a screen in said adapter chamber for preventing passage of oversized particles, and for separating the adapter chamber into a pre-screen chamber and a post-screen chamber, the screen being in the shape of a pyramid or cone having a screen apex and a screen perimeter, the apex facing the adapter inlet and the perimeter fitting against an enclosed perimeter of the adapter chamber; and,
    means for removal of unscreened oversized particles from said pre-screen chamber.

2. The adapter as recited in claim 1 wherein the screen is in the shape of a cone.

3. The adapter as recited in claim 1 further comprising a dust protector located to prevent dust from escaping from the inlet.

4. The adapter as recited in claim 1 further comprising an outlet conduit communicating with the adapter outlet.

5. The adapter as recited in claim 1 wherein the adapter housing comprises:
    a base;
    at least one lateral wall attached to the base, said at least one lateral wall forming the enclosed perimeter of the chamber; and,
    a top attached to said at least one lateral wall opposite the base, with the inlet passing through the top.

6. The adapter as recited in claim 5 wherein the perimeter of the screen abuts the enclosed perimeter of the chamber of the adapter housing.

7. The adapter as recited in claim 5 wherein said at least one lateral wall is cylindrical and having an adapter axis.

8. The adapter as recited in claim 7 wherein the adapter inlet is coaxial with the adapter axis.

9. The adapter as recited in claim 8 wherein the adapter outlet is coaxial with the adapter axis.

10. A system comprising:
    a storage container for particulate solids comprising a storage container outlet;
    an unloading adapter in communication with the storage container comprising:
    an enclosed adapter housing comprising an adapter chamber, an adapter inlet in communication with the storage container outlet and an adapter outlet;
    a screen separating the adapter chamber into a pre-screen chamber and a post-screen chamber, the screen being in the shape of a pyramid or cone having a screen apex and a screen perimeter, the apex facing the adapter inlet and the perimeter fitting against an enclosed perimeter of the adapter chamber; and
    a means for removal of unscreened oversized particles;
    a hydrator comprising:
    a means to draw the particulate solids from the adapter outlet;
    a means to hydrate the particulate solids; and,
    a means to transfer the hydrated particulate solids from the hydrator.

11. The system as recited in claim 10 wherein the screen is in the shape of a cone.

12. The system as recited in claim 10 wherein the storage container is a truck having a top and a bottom, and the storage container outlet is located at the bottom of the truck to gravity unload therethrough to the adapter chamber.

13. The system as recited in claim 12 further comprising:
    a means to attach the adapter at the storage container outlet, said means further comprising a storage container outlet conduit from the storage container outlet passing through the adapter inlet into the adapter chamber, and a dust shroud positioned between the storage container outlet conduit and the adapter inlet.

14. The system as recited in claim 10 wherein said means to draw and means to hydrate further comprises:
    a solvation hopper comprising a hopper wall, a hopper inlet, and a hopper outlet;
    a hopper inlet conduit sealingly communicating with the hopper through the hopper inlet, the hopper inlet conduit in communication with the adapter through the adapter outlet; and,
    a liquid driven eductor comprising an eductor liquid inlet, an eductor outlet, and an eductor suction opening, the eductor suction opening in sealed communication with the hopper outlet.

15. The system as recited in claim 14 further comprising a slurry storage tank in communication with the eductor outlet.

16. The system as recited in claim 15 further comprising a means to transfer the hydrated solids between the slurry storage tank and the eductor outlet.

17. The system as recited in claim 10 wherein the adapter housing comprises:
    a base;
    at least one lateral wall attached to the base, said at least one lateral wall forming the enclosed perimeter of the chamber; and,
    a top attached to said at least one lateral wall opposite the base, with the inlet passing through the top.

18. The system as recited in claim 17 wherein the perimeter of the screen abuts the enclosed perimeter of the chamber of the adapter housing.

19. The system as recited in claim 17 wherein said at least one lateral wall is cylindrical and the adapter has an adapter axis.

20. The system as recited in claim 19 wherein the adapter inlet is coaxial with the adapter axis.

21. The system as recited in claim 20 wherein the adapter outlet is coaxial with the adapter axis.

22. A method comprising the steps of:
    connecting an adapter to a source of particulate solids, the adapter comprising an enclosed adapter housing comprising an adapter chamber, an adapter inlet and an adapter outlet, and a screen separating the adapter chamber into a pre-screen chamber and a post-screen chamber, the screen being in the shape of a pyramid or cone having a screen apex and a screen perimeter, the apex facing the adapter inlet and the perimeter fitting against a perimeter of the adapter chamber;

screening the particulate solids in the adapter to separate oversized particles;

removing said oversized particles;

opening the outlet into communication with a hydrator; and, drawing the particulate solid from the source of particulate solids through the adapter outlet and into the hydrator.

23. The method as recited in claim 22 wherein the hydrator comprises a liquid eductor and the method further comprises the steps of:

passing a liquid stream through the liquid eductor having a suction opening; and, wherein the drawing step further comprises drawing the particulate solids through a feed conduit communicating with the adapter outlet and into the liquid eductor through the suction opening of the eductor.

24. The method as recited in claim 23 wherein the drawing step comprises feeding the particulate solid from the feed conduit to a hopper; and drawing the particulate solids from the hopper into the suction opening.

25. The method as recited in claim 24 further comprising hydrating the solid in the hopper.

* * * * *